(12) United States Patent
Nicklass et al.

(10) Patent No.: US 7,878,083 B2
(45) Date of Patent: Feb. 1, 2011

(54) DUAL CLUTCH TRANSMISSION

(75) Inventors: Oliver Nicklass, Kronau (DE); Andreas Mueller, Durlangen (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 518 days.

(21) Appl. No.: 11/958,342

(22) Filed: Dec. 17, 2007

(65) Prior Publication Data
US 2008/0156127 A1  Jul. 3, 2008

(30) Foreign Application Priority Data
Dec. 18, 2006  (DE) ................ 10 2006 061 515

(51) Int. Cl.
*F16H 3/08* (2006.01)
(52) U.S. Cl. ........................ 74/330; 74/340
(58) Field of Classification Search ........... 74/330, 74/333, 340
See application file for complete search history.

(56) References Cited

U.S. PATENT DOCUMENTS

| | | | | |
|---|---|---|---|---|
| 4,658,663 | A * | 4/1987 | Hiraiwa .................... 74/359 |
| 4,957,016 | A * | 9/1990 | Amedei et al. ............. 74/336 R |
| 5,014,567 | A | 5/1991 | Horiuchi et al. |
| 7,287,442 | B2 * | 10/2007 | Gumpoltsberger ........... 74/331 |
| 7,472,617 | B2 * | 1/2009 | Nicklass ..................... 74/340 |
| 2005/0103140 | A1 | 5/2005 | Gumpoltsberger |
| 2006/0101933 | A1 | 5/2006 | Koenig et al. |

FOREIGN PATENT DOCUMENTS

| | | |
|---|---|---|
| DE | 37 15 880 A1 | 5/1988 |
| DE | 39 32 264 C2 | 5/1990 |
| DE | 195 24 233 C2 | 1/1997 |
| DE | 103 43 994 | 5/2005 |
| DE | 10 2005 005 338 B3 | 8/2006 |
| EP | 1031765 A2 | 8/2000 |
| EP | 1 580 456 A2 | 9/2005 |
| JP | 2006132755 | 5/2006 |

OTHER PUBLICATIONS

European Search Report dated May 15, 2008; Application No. 07020109.0.

* cited by examiner

*Primary Examiner*—Ha D. Ho
(74) *Attorney, Agent, or Firm*—Knobbe, Martens, Olson & Bear LLP

(57) ABSTRACT

A dual clutch transmission has a housing, a drive shaft arrangement, an output shaft and a countershaft. A plurality of gear sets is supported on the drive shaft arrangement and the countershaft, respectively. The gear sets are shifted by means of respective shifting clutches in order to engage different gears. The countershaft is connected to the output shaft via a constant output gear set. The gear sets are divided between two gear trains. A first forward gear and a reverse gear are each assigned to a different gear train. The gear set for the reverse gear is driven via an auxiliary shaft, which is in turn driven via a specific gear set. The specific gear set is assigned to the same gear train as the reverse gear.

11 Claims, 1 Drawing Sheet

DUAL CLUTCH TRANSMISSION

CROSS-REFERENCE TO RELATED APPLICATIONS

This application claims the priority of German patent application 10 2006 061.515 filed Dec. 18, 2006.

BACKGROUND OF THE INVENTION

The present invention relates to a dual clutch transmission, particularly for motor vehicles, having a housing, a drive shaft arrangement, an output shaft and a countershaft, a plurality of gear sets being supported on the drive shaft arrangement and/or the countershaft, the gear sets being shifted by means of respective shifting clutches in order to engage different gears, the countershaft being connected to the output shaft via a constant output gear set, and the gear sets being divided between two gear trains.

Such a step-variable transmission is disclosed by DE 10 2005 005 338 B3. This known transmission is a so-called in-line transmission, that is to say a transmission intended for longitudinal installation in the motor vehicle.

Such conventional in-line transmissions generally have a constant drive gear set. At the transmission input end a constant drive gear set usually comprises a fixed gear fixedly connected to the drive shaft and a fixed gear fixedly connected to the countershaft. In the case of dual clutch transmissions a separate constant drive gear set is usually provided for each drive shaft.

Such a constant drive gear set transmits the transmission input-side torque (generally the torque from the engine of the motor vehicle, such as an internal combustion engine) directly to the transmission input. This leads to a relatively high torque load on the countershaft.

This means that the teeth of the gear sets for the various gears have to be made relatively broad, in order to absorb the high torques. The shifting clutches also have to be designed for the comparatively high torques, especially where the shifting clutches, as is usual, are so-called synchronizer clutches.

EP 1 031 765 A2 (corresponding to U.S. Pat. No. 6,279,431) on the other hand relates to an inline transmission having a constant output gear set. In a transmission of this type, a constant gear set is located in the area of the transmission output or in the area of the output shaft. This measure serves to reduce the torque load acting on the countershaft. Compared to constant drive solutions, however, there is an increase in the rotational speed in the area of the countershaft.

The lower torque loads mean that the teeth of the gear sets can be of more slender design than solutions with a constant drive gear set. The transmission can therefore generally be of shorter design construction in an axial direction. Only the constant output gear set has to be made significantly broader than on step-variable transmissions with constant drive gear set. The load acting on the shifting clutches (synchromesh) is further reduced. This also affords shorter gearshift times.

One problem with step-variable transmissions having constant output gear sets is that it is comparatively difficult to support the constant output gear set rigidly, so that it still has an acceptable tooth bearing contact area despite its comparatively large width. Although the output shaft can generally be of short design construction, for the reason stated it nevertheless usually projects well to the rear, as embodied, for example, in EP 1 031 765 A2.

This immediately negates the design advantage of the overall length achievable with this type of transmission.

DE 39 32 264 C2 (corresponding to U.S. Pat. No. 5,014,567) discloses another step-variable transmission with constant output gear set. The transmission is embodied as a 5-gear transmission, the fourth gear being designed as a direct gear, in which the drive shaft is directly connected to the output shaft. The drive shaft is furthermore supported in the output shaft. Here too, the output shaft projects relatively far out in an axial direction.

The publication DE 10 2005 005 338 B3 first cited discloses a dual clutch transmission with constant output gear set, in which the gear sets for the first forward gear and the reverse gear are divided between the two gear trains. This is advantageous, since it is possible to change between forward and reverse travel purely through control of the clutch. This is advantageous, for example, in rocking the vehicle out of situations in which there is little traction on the drive wheels.

A disadvantage to this is that there is a relatively large difference in the transmission ratios for the first forward gear and the reverse gear.

In an alternative disclosed in this document, the first forward gear and the reverse gear are assigned to the same gear train. This allows the transmission ratios to be coordinated. When changing gear between these gears, however, a shift sequence is absolutely necessary.

Furthermore, in the dual clutch transmissions disclosed in this document the constant output gear set is always assigned to the highest forward gear.

SUMMARY OF THE INVENTION

In this context the object of the invention is to specify an improved dual clutch transmission, in particular one having a constant output and a short overall length.

This object is achieved, according to a first aspect of the present invention, by a dual clutch transmission, having a housing, a drive shaft arrangement, an output shaft and a countershaft, a plurality of gear sets being supported on the drive shaft arrangement and/or the countershaft, the gear sets being shifted by means of respective shifting clutches in order to engage different gears, the countershaft being connected to the output shaft via a constant output gear set, and the gear sets being divided between two gear trains, a first forward gear and a reverse gear each being assigned to a different gear train, the gear set for the reverse gear being driven via an auxiliary shaft, which is in turn driven via a specific gear set, which is assigned to the same gear train as the reverse gear.

This measure means firstly that the vehicle can be rocked out of situations purely through clutch control of the dual clutch. Secondly, driving the gear set for the reverse gear via an auxiliary shaft means that the transmission ratios for the first forward gear and the reverse gear can be matched to one another.

In other words, an additional transmission ratio, which enables the transmission ratio of the reverse gear to be adjusted to the transmission ratio of the first forward gear, can be introduced via the auxiliary shaft.

It is particularly advantageous if a first gear wheel, which meshes with the specific gear set, is fixed to the auxiliary shaft.

This means that the attachment of the auxiliary shaft to the specific gear set can be achieved through a comparatively easy design. It is generally also feasible, however, to provide the connection by way of a chain, a friction wheel or the like.

According to a further preferred embodiment a second gear wheel, which meshes with the gear set for the reverse gear, is fixed to the auxiliary shaft.

Here too, the attachment of the auxiliary shaft to the reverse gear is of advantageous design.

In the case of the first and second gear wheels, it is especially advantageous if these are embodied as spur gears, which mesh directly with gear wheels of the specific gear set and the gear set for the reverse gear, respectively.

It is furthermore particularly advantageous if the specific gear set is assigned to the second forward gear.

In this way it is comparatively easy to configure the transmission via the auxiliary shaft, so that an adjustment of the transmission ratio of the reverse gear to that of the first forward gear is feasible. This can furthermore be achieved in a relatively small overall space, particularly in a radial direction.

It is furthermore advantageous overall if the auxiliary shaft is connected to a gear wheel of the specific gear set, that is fixed to the drive shaft arrangement.

In other words, it is advantageous here to make an engagement with a fixed gear of the specific gear set. This is particularly expedient because a clutch plate pack or the like, which would make an attachment more difficult, is generally arranged on the loose gear of the respective gear set.

According to a second aspect of the present invention, the stated object is achieved by a dual clutch transmission, having a housing, a drive shaft arrangement, an output shaft and a countershaft, a plurality of gear sets being supported on the drive shaft arrangement and/or the countershaft, the gear sets being shifted by means of respective shifting clutches in order to engage different gears, the countershaft being connected to the output shaft via a constant output gear set, and the gear sets being divided between two gear trains, the output shaft being supported on two bearings close to its opposite ends, the constant output gear set and at least another of the gear sets being axially supported in the area between the two bearings of the output shaft, and the other gear set being assigned to the highest forward gear and the constant output gear set being assigned to the third-highest forward gear.

In this case the constant output gear set can be assigned to the fifth forward gear and the other gear set to the seventh forward gear, for example.

This allows the third-highest forward gear to be designed as a direct gear.

The arrangement of the highest and third-highest gear sets between the two bearings of the output shaft furthermore makes it comparatively easy in design terms to transpose the gear seats, in order thereby to obtain an optimum transmission synchronization to suit the particular application.

There is no need here to make any modification to the arrangement of the other gear sets.

The embodiment according to the second aspect of the invention can obviously be ideally combined with the first aspect of the invention.

It is furthermore obvious that the second aspect of the present invention can equally well be applied to a manual shift transmission or to an automated shift transmission (MST or AMT).

The operating principle of step-variable transmissions with constant output gear set is disclosed in detail in DE 10 2005 005 338 B3 cited above, and the foreign counterparts thereof. The disclosure of these documents will here be incorporated by reference.

The features specified above and those still to be explained below can obviously be used not only in the particular combination indicated but also in other combinations, or singly, without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing.

DETAILED DESCRIPTION OF THE INVENTION

Figure 1:
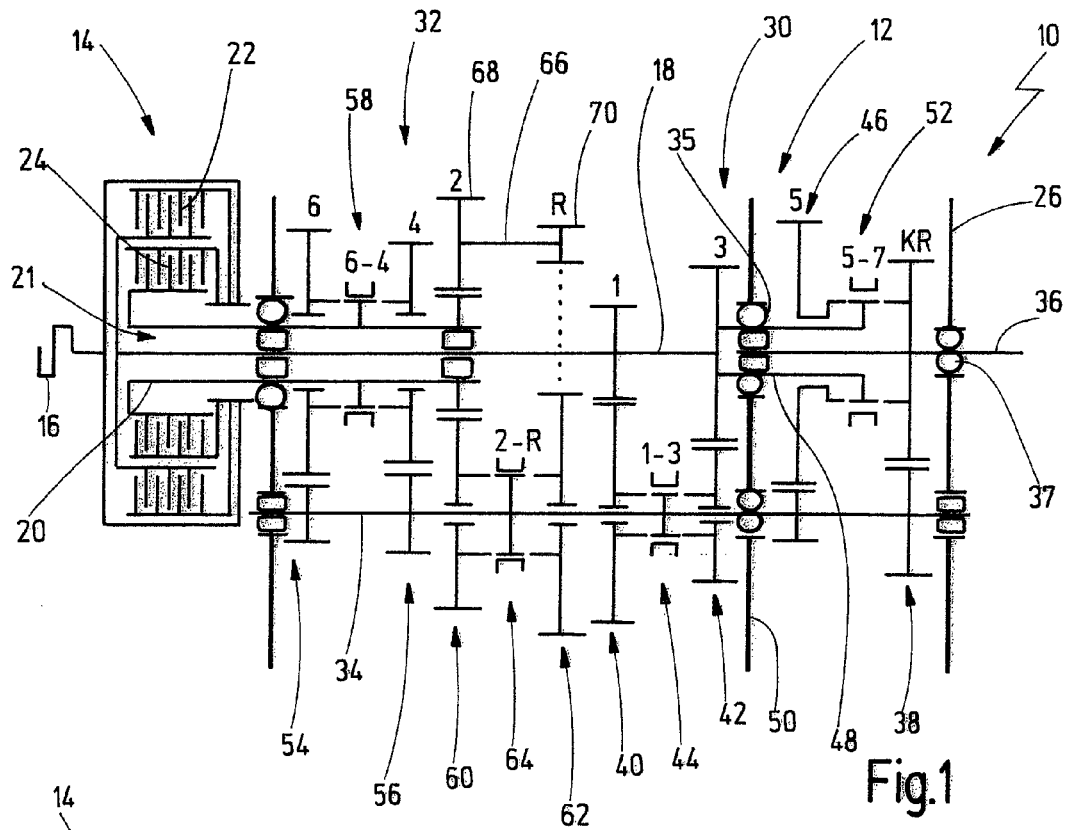
FIG. 1 shows a schematic, simplified representation of one embodiment of a dual clutch transmission according to the first aspect of the invention.

In FIG. 1 a dual clutch transmission according to the first aspect of the present invention is generally denoted by 10.

The dual clutch transmission 10 comprises a step-variable transmission 12 of spur gear type and a dual clutch arrangement 14. An input member of the dual clutch arrangement 14 is connected to a schematically indicated drive engine, such as an internal combustion engine 16.

The step-variable transmission 12 comprises a drive shaft arrangement 21 with a first drive shaft 18 and a second drive shaft 20 in the form of a hollow shaft supported coaxially with the former.

The dual clutch arrangement 14 comprises a first clutch 22, the output member of which is connected to the first drive shaft 18. The dual clutch arrangement 14 further comprises a second clutch 24, the output member of which is connected to the second drive shaft 20. The clutches 22, 24 may be nested one radially inside the other, as shown, or lie axially in series. The clutches 22, 24 may also take the form of friction clutches, in particular plate clutches. In this case embodiment both as a wet plate clutch and as a dry clutch is feasible.

The step-variable transmission 12 furthermore comprises a housing 26 with the drive shaft arrangement 21 passing through the drive side. The step-variable transmission 12 further comprises a first gear train (first partial transmission) 30 and a second gear train 32 (second partial transmission). On the drive side the first gear train 30 is connected to the first drive shaft 18. On the drive side the second gear train 32 is connected to the second drive shaft 20.

The two gear trains 30, 32 have a common countershaft 34. The step-variable transmission 12 furthermore comprises an output shaft 36, which is arranged coaxially with the drive shaft arrangement 21. The output shaft 36 is supported by means of a first bearing 35 and a second bearing 37.

The step-variable transmission 12 further comprises a constant output gear set 38, which in this case is assigned to the highest forward gear 7 (in other words, the $7^{th}$ gear is embodied as a direct gear). The constant output gear set 38 is arranged between the two bearings 35, 37. It comprises two intermeshing fixed gears, one of which is connected to the countershaft 34 and the other to the output shaft 36.

The first gear train 30 has a gear set 40 for the first forward gear and a gear set 42 for the third forward gear. Between the two gear sets 40, 42 a clutch plate pack 44 for the first and third gears is arranged on the countershaft 34.

At the opposite end to the dual clutch arrangement 14, the first drive shaft 18 further comprises a hollow shaft section 48. The hollow shaft section 48 passes through an intermediate bearing plate 50 of the housing 26 and is arranged coaxially around a section of the output shaft 36. A loose gear of the gear set 46 for the fifth forward gear is supported on the hollow shaft section 48. Supported on the hollow shaft section 48 and between the constant output gear set 38 and the gear set 46 for the fifth forward gear (the third highest forward gear), a clutch plate pack 52 for these gears is arranged.

In this way it is possible to bypass the constant output gear set 38 in the manner of a direct gear, the clutch plate pack 52 being designed to connect the hollow shaft section 48 of the first drive shaft 18 to the output shaft 36.

The second gear train 32 comprises a gear set 54 for the sixth forward gear and a gear set 56 for the fourth forward gear, which are arranged in the housing 26 adjacent to the dual clutch arrangement 14. A clutch plate pack 58 for these gears is arranged between the gear sets 54, 46. The second gear train 32 furthermore comprises a gear set 60 for the second forward gear. A gear set 62 for the reverse gear is arranged in the first gear train 30 axially adjacent to this gear set 60 for the second forward gear.

A clutch plate pack 64 for the gear sets 60, 62 is arranged on the countershaft 34 between these gear sets.

The step-variable transmission 12 further comprises an auxiliary shaft 66, which is arranged parallel to the drive shaft arrangement 21 and parallel to the countershaft 34 and in an axial direction extends approximately from the gear set 60 for the second forward gear to the gear set 62 for the reverse gear.

A first gear wheel 68 and a second gear wheel 70 are fixed to the auxiliary shaft 66. The first gear wheel 68 meshes with a fixed gear of the gear set 60 for the second forward gear. The second gear wheel 70 meshes with a loose gear of the gear set 62 for the reverse gear supported on the countershaft 34. The two gear wheels 68, 70 take the form of spur gears.

A transmission ratio for driving the reverse gear is established via the auxiliary shaft 66 and the gear wheels 68, 70 and allows the overall transmission ratio of the reverse gear to be adjusted to that of the first forward gear. The first forward gear and the reverse gear are furthermore situated in different gear trains 30, 32, so that it is possible to rock the vehicle out of situations in which there is little traction on the drive wheels.

The clutch plate packs of the step-variable transmission 12 may be embodied as dog clutches, but are preferably equipped with synchromesh clutches. It furthermore goes without saying that the dual clutch transmission 10 is generally automated, the actuation both of the two clutches 22, 24 and also of the shifting clutches in each case being coordinated with one another by an overriding control.

Finally, it should be mentioned that the preferred order of the elements in the step-variable transmission 12 starting from the drive side in the area of the dual clutch arrangement 14 is as follows: gear set 54 for the sixth gear, shifting clutch plate pack 58, gear set 56 for the fourth forward gear, gear set 60 for the second forward gear, shifting clutch plate pack 64, gear set 62 for the reverse gear, gear set 40 for the first forward gear, shifting clutch plate pack 44, gear set 42 for the third forward gear, intermediate plate 50, gear set 46 for the fifth forward gear, shifting clutch plate pack 52 and constant output gear set 38.

Figure 2:
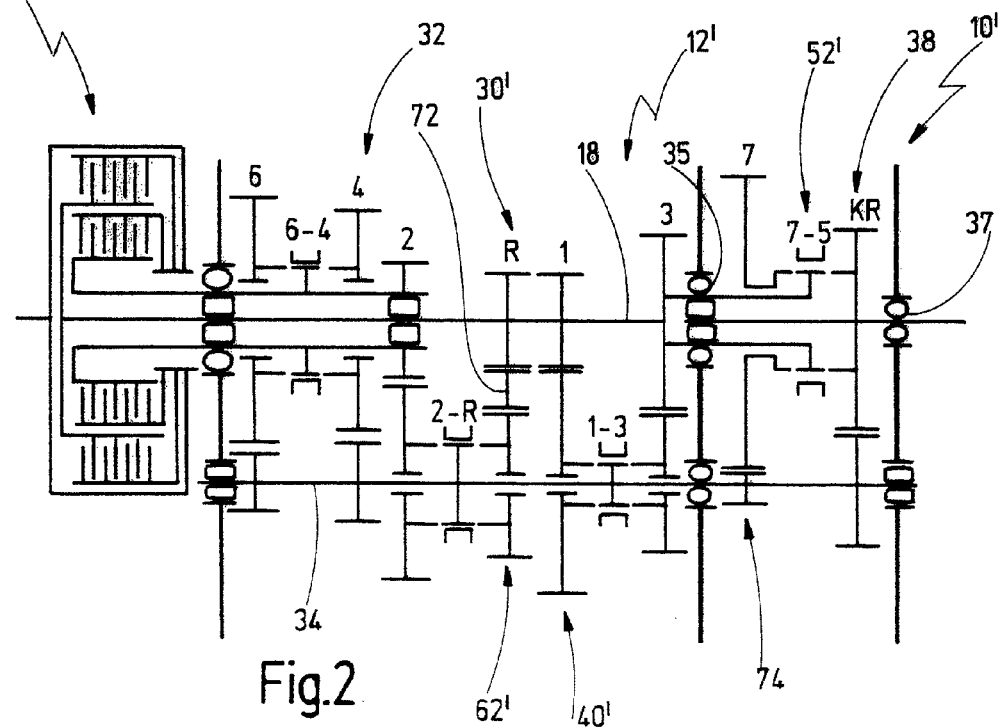
FIG. 2 shows a further embodiment of a dual clutch transmission according to the second aspect of the invention.

In FIG. 2 a dual clutch transmission according to the second aspect of the present invention is generally denoted by 10'. In terms of its construction and operating principle the dual clutch transmission 10' generally corresponds to the dual clutch transmission 10 in FIG. 1. Corresponding elements are provided with the same reference numerals. For this reason only the differences between these two transmissions will be explored below.

Thus, in the case of the step-variable transmission 12' of the dual clutch transmission 10' the gear sets 62', 40' for the reverse gear R and first forward gear respectively are assigned to the first gear train 30'. These may have largely identical transmission ratios, the direction of rotation of the reverse gear R being reversed by way of reversing gear wheel 72 between a loose gear on the countershaft 34 and a fixed gear on the first drive shaft 18.

Furthermore, in the step-variable transmission 12' the constant output gear set 38 is assigned to the third-highest gear, which means that in this case the $5^{th}$ gear is designed as a direct gear. The highest forward gear ($7^{th}$ gear), however is also arranged in the area between the two bearings 35, 37, the gear set for the seventh forward gear here being denoted by 74.

In the dual clutch transmission 10 in FIG. 1 also, the highest forward gear and the third-highest forward gear can obviously be designed so that the third-highest forward gear is configured as direct gear (i.e. is assigned the constant output gear set 38).

Consequently, in the clutch transmissions according to the invention variants with the highest gear or the third-highest gear can be constituted as direct gear without the need to modify the arrangement of the other gear sets in any way. This development is also feasible in other step-variable transmissions, for example in manual shift step-variable transmissions or automated shift transmissions.

What is claimed is:

1. Dual clutch transmission having a housing, a drive shaft arrangement, an output shaft and a countershaft, a plurality of gear sets being supported on the drive shaft arrangement and the countershaft, respectively, the gear sets being shifted by means of respective shifting clutches in order to engage different gears, the countershaft being connected to the output shaft via a constant output gear set, and the gear sets being divided between two gear trains, wherein a first forward gear and a reverse gear are each assigned to a different gear train, the gear set for the reverse gear being driven via an auxiliary shaft, which is in turn driven via a specific gear set, which is assigned to the same gear train as the reverse gear.

2. Dual clutch transmission according to claim 1, wherein a fixed gear, which meshes with the specific gear set, is fixed to the auxiliary shaft.

3. Dual clutch transmission according to claim 1, wherein a second gear wheel, which meshes with the gear set for the reverse gear, is fixed to the auxiliary shaft.

4. Dual clutch transmission according to claim 1, wherein the specific gear set is assigned to the second forward gear.

5. Dual clutch transmission according to claim 1, wherein the auxiliary shaft is connected to a gear wheel of the specific gear set, which is fixed to the drive shaft arrangement.

6. Dual clutch transmission according to claim 1, wherein the output shaft is supported on two bearings close to its opposite ends, the constant output gear set and at least another of the gear sets being axially supported in the area between the two bearings of the output shaft, and the other gear set being assigned to a highest forward gear and the constant output gear set being assigned to a third-highest forward gear.

7. Dual clutch transmission having a housing, a drive shaft arrangement, an output shaft and a countershaft, a plurality of gear sets being supported on the drive shaft arrangement and the countershaft, respectively, the gear sets being shifted by means of respective shifting clutches in order to engage different gears, the countershaft being connected to the output shaft via a constant output gear set, and the gear sets being divided between two gear trains, the output shaft being supported on two bearings close to its opposite ends, the constant output gear set and at least another of the gear sets being axially supported in the area between the two bearings of the output shaft, and the other gear set being assigned to a highest forward gear and the constant output gear set being assigned to a third-highest forward gear, wherein a gear set for a reverse gear is driven via an auxiliary shaft, which is in turn driven via a specific gear set, which is assigned to the same gear train as the reverse gear.

8. Dual clutch transmission according to claim 7, wherein a fixed gear, which meshes with the specific gear set, is fixed to the auxiliary shaft.

9. Dual clutch transmission according to claim 7, wherein a second gear wheel, which meshes with the gear set for the reverse gear, is fixed to the auxiliary shaft.

10. Dual clutch transmission according to claim 7, wherein the specific gear set is assigned to the second forward gear.

11. Dual clutch transmission according to claim 7, wherein the auxiliary shaft is connected to a gear wheel of the specific gear set, which is fixed to the drive shaft arrangement.

* * * * *